United States Patent
Murthy et al.

(10) Patent No.: US 12,434,715 B2
(45) Date of Patent: Oct. 7, 2025

(54) CAMERA MONITORING SYSTEM INCLUDING IMAGE BASED IMPAIRED DRIVING ANALYTICS

(71) Applicant: Stoneridge Electronics AB, Solna (SE)

(72) Inventors: Banuprakash Murthy, Novi, MI (US); Troy Otis Cooprider, White Lake, MI (US)

(73) Assignee: Stoneridge Electronics AB, Solna (SE)

( * ) Notice: Subject to any disclaimer, the term of this patent is extended or adjusted under 35 U.S.C. 154(b) by 385 days.

(21) Appl. No.: 18/080,074

(22) Filed: Dec. 13, 2022

(65) Prior Publication Data
US 2024/0193963 A1     Jun. 13, 2024

(51) Int. Cl.
  *B60W 40/09*   (2012.01)
  *B60W 50/14*   (2020.01)
  *G06V 20/56*   (2022.01)
  *G07C 5/00*    (2006.01)
  *G08G 1/04*    (2006.01)

(52) U.S. Cl.
  CPC ............ *B60W 40/09* (2013.01); *B60W 50/14* (2013.01); *G06V 20/588* (2022.01); *G07C 5/008* (2013.01); *G08G 1/04* (2013.01)

(58) Field of Classification Search
  CPC .... B60W 40/09; B60W 50/14; G06V 20/588; G07C 5/008; G08G 1/04
  See application file for complete search history.

(56) References Cited

U.S. PATENT DOCUMENTS

| | | | |
|---|---|---|---|
| 2013/0215274 A1 | 8/2013 | Son et al. | |
| 2015/0307094 A1* | 10/2015 | Ito | B62D 15/025 701/1 |
| 2018/0012092 A1* | 1/2018 | Gleeson-May | G06V 10/95 |
| 2021/0019959 A1* | 1/2021 | Trinh | H04L 27/2627 |
| 2024/0367671 A1* | 11/2024 | Yano | G08G 1/0133 |

FOREIGN PATENT DOCUMENTS

| | | | |
|---|---|---|---|
| DE | 102011013663 | 9/2012 | |
| EP | 3418992 | 12/2018 | |
| GB | 2488886 B * | 9/2012 | B60K 28/066 |

OTHER PUBLICATIONS

International Search Report and Written Opinion for International Patent Application No. PCT/US2022/052647 dated Jul. 3, 2023.
International Preliminary Report on Patentability for International Patent Application No. PCT/US2022/052647 dated Jun. 26, 2025.

* cited by examiner

*Primary Examiner* — Casey L Kretzer
(74) *Attorney, Agent, or Firm* — Carlson, Gaskey & Olds, P.C.

(57) ABSTRACT

A method for detecting inattentive vehicle operation includes using a camera monitor system (CMS) controller to identify how centered a vehicle containing the CMS controller is within a first lane line and a second lane line. The determination is done by analyzing at least one image generated by the CMS, and identifying an inattentive driving event has occurred in response to the vehicle centering deviating from a lane center according to a predefined characteristic.

13 Claims, 6 Drawing Sheets

FIG.7

CAMERA MONITORING SYSTEM INCLUDING IMAGE BASED IMPAIRED DRIVING ANALYTICS

TECHNICAL FIELD

This disclosure relates to a camera monitoring system (CMS) for a vehicle, and specifically to CMS module configured to identify and respond to impaired driving using computer based analysis of the images generated by the CMS.

BACKGROUND

Mirror replacement systems, and camera systems for supplementing mirror views, are utilized in vehicles to enhance the ability of a vehicle operator to see a surrounding environment. Camera monitoring systems (CMS) include one or more camera systems, which provide fields of view to vehicle operators, including forward, side and rear fields of view. In some examples, the camera systems cover a larger field of view than a conventional mirror, or include views that are not fully obtainable via a conventional mirror and can be used as mirror supplements and/or mirror replacement. In other examples, the CMS can use computer algorithms and processors to generate stitched, manipulated, and/or extrapolated views capable of providing substantial additional information to a vehicle operator.

In addition to mirror replacement, the images provided via the cameras in the CMS can be utilized to detect aspects of the environment and aspects of the vehicle, and can be used with image-processing-based detection processes capable of achieving various safety, convenience, and operational efficiency advantages.

SUMMARY OF THE INVENTION

An exemplary method for detecting inattentive vehicle operation includes using a camera monitor system (CMS) controller to identify how centered a vehicle containing the CMS controller is within a first lane line and a second lane line by analyzing at least one image generated by the CMS, and identifying an inattentive driving event has occurred in response to the vehicle centering deviating from a lane center according to a predefined characteristic.

In another example of the above described method for detecting inattentive vehicle operation the predefined characteristic includes at least one of an instantaneous vehicle centering and a vehicle centering over time.

In another example of any of the above described methods for detecting inattentive vehicle operation the predefined characteristic is the vehicle centering overtime, and wherein the deviation is a difference between a curvature of a line defined by the vehicle centering over time and a curvature of a lane defined by the first lane line and the second lane line.

In another example of any of the above described methods for detecting inattentive vehicle operation the curvature of the lane is determined at least in part by determining a geospatial positioning of the vehicle determined by the CMS controller and comparing the geospatial positioning to map data.

In another example of any of the above described methods for detecting inattentive vehicle operation the curvature of the lane is determined at least in part using image analysis of the at least one image generated by the CMS.

In another example of any of the above described methods for detecting inattentive vehicle operation the curvature of the lane is determined exclusively using image analysis of the at least one image generated by the CMS.

Another example of any of the above described methods for detecting inattentive vehicle operation further includes activating an inattentive driving response in response to identifying the inattentive driving event.

In another example of any of the above described methods for detecting inattentive vehicle operation the inattentive driving response includes any combination of one or more of storing driving parameters for subsequent upload to a remote fleet monitoring system, incautiously uploading driving parameters to the remote fleet monitoring system, activating an audio alert to a vehicle operator, and activating a visual alert to the vehicle operator.

In another example of any of the above described methods for detecting inattentive vehicle operation the driving parameters include at least two of speed, steering angle, gear, and engine RPMs and the at least one image generated by the CMS.

In another example of any of the above described methods for detecting inattentive vehicle operation the at least one image generated by the CMS includes at least one of a rear facing image generated by a trailer mounted rear facing camera and an image generated by a Class II/IV mirror.

In one exemplary embodiment a Camera Monitoring System (CMS) for a vehicle includes a plurality of exterior facing cameras disposed about the vehicle each camera defining a field of view configured to include at least one lane line defining a lane in which the vehicle is operating while the vehicle is moving, and a CMS controller configured to receive images from each of the cameras in the plurality of exterior facing cameras and including a non-transitory memory and a processor, the non-transitory memory being configured to cause the controller to identify how centered a vehicle containing the CMS controller is within a first lane line and a second lane line by analyzing at least one image generated by the CMS, and identify an inattentive driving event has occurred in response to the vehicle centering deviating from a lane center according to a predefined characteristic.

In another example of the above described CMS for a vehicle the predefined characteristic includes at least one of an instantaneous vehicle centering and a vehicle centering over time.

In another example of any of the above described CMSs for a vehicle the predefined characteristic is the vehicle centering overtime, and wherein the deviation is a difference between a curvature of a line defined by the vehicle centering over time and a curvature of a lane defined by the first lane line and the second lane line.

In another example of any of the above described CMSs for a vehicle the memory further stores instructions for causing the CMS to activate an inattentive driving response in response to identifying the inattentive driving event.

In another example of any of the above described CMSs for a vehicle the inattentive driving response includes any combination of one or more of storing driving parameters for subsequent upload to a remote fleet monitoring system, incautiously uploading driving parameters to the remote fleet monitoring system, activating an audio alert to a vehicle operator, and activating a visual alert to the vehicle operator.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
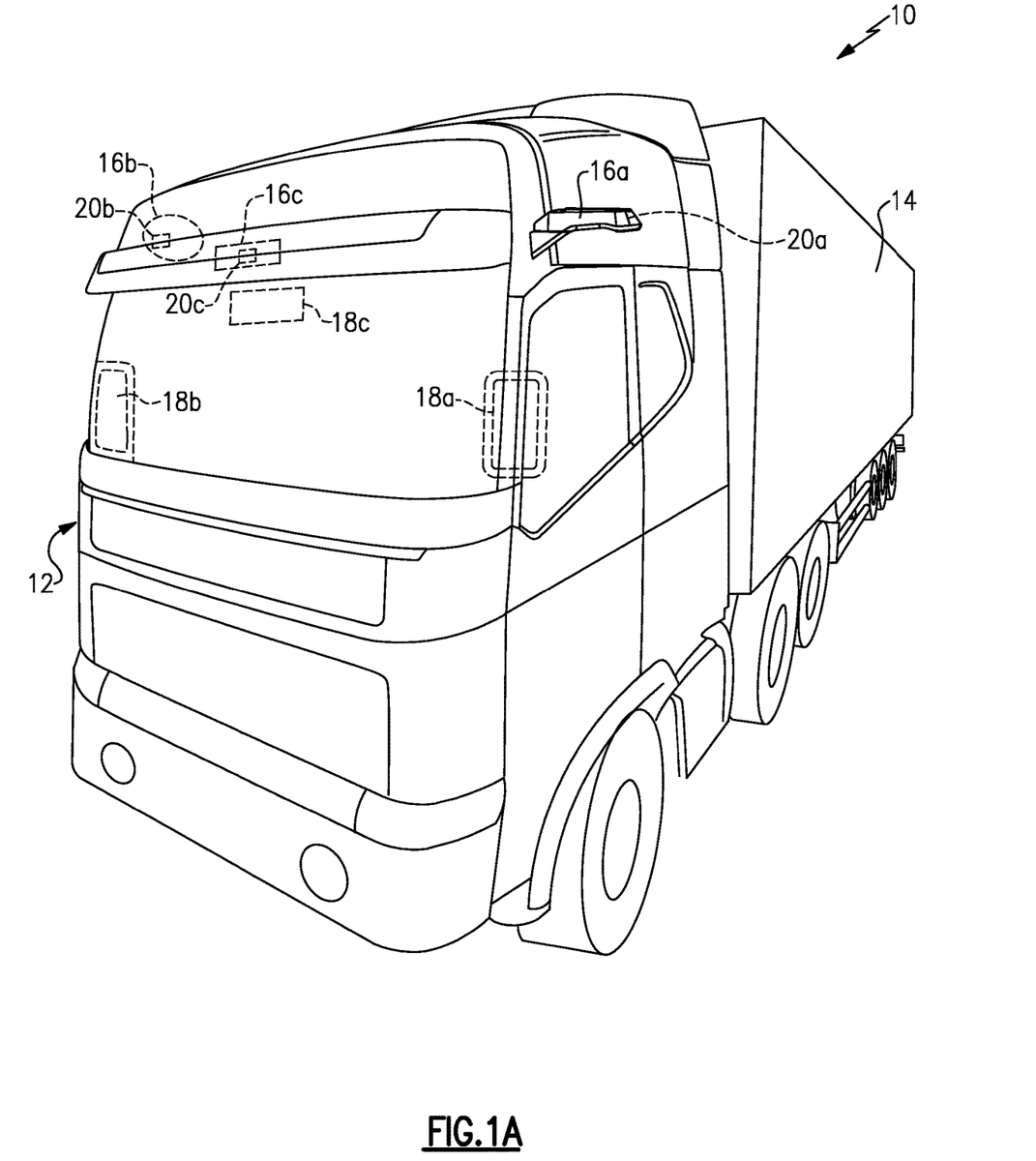
FIG. 1A is a schematic front view of a commercial truck with a camera monitoring system (CMS) used to provide at least Class II and Class IV views.
Figure 1B:
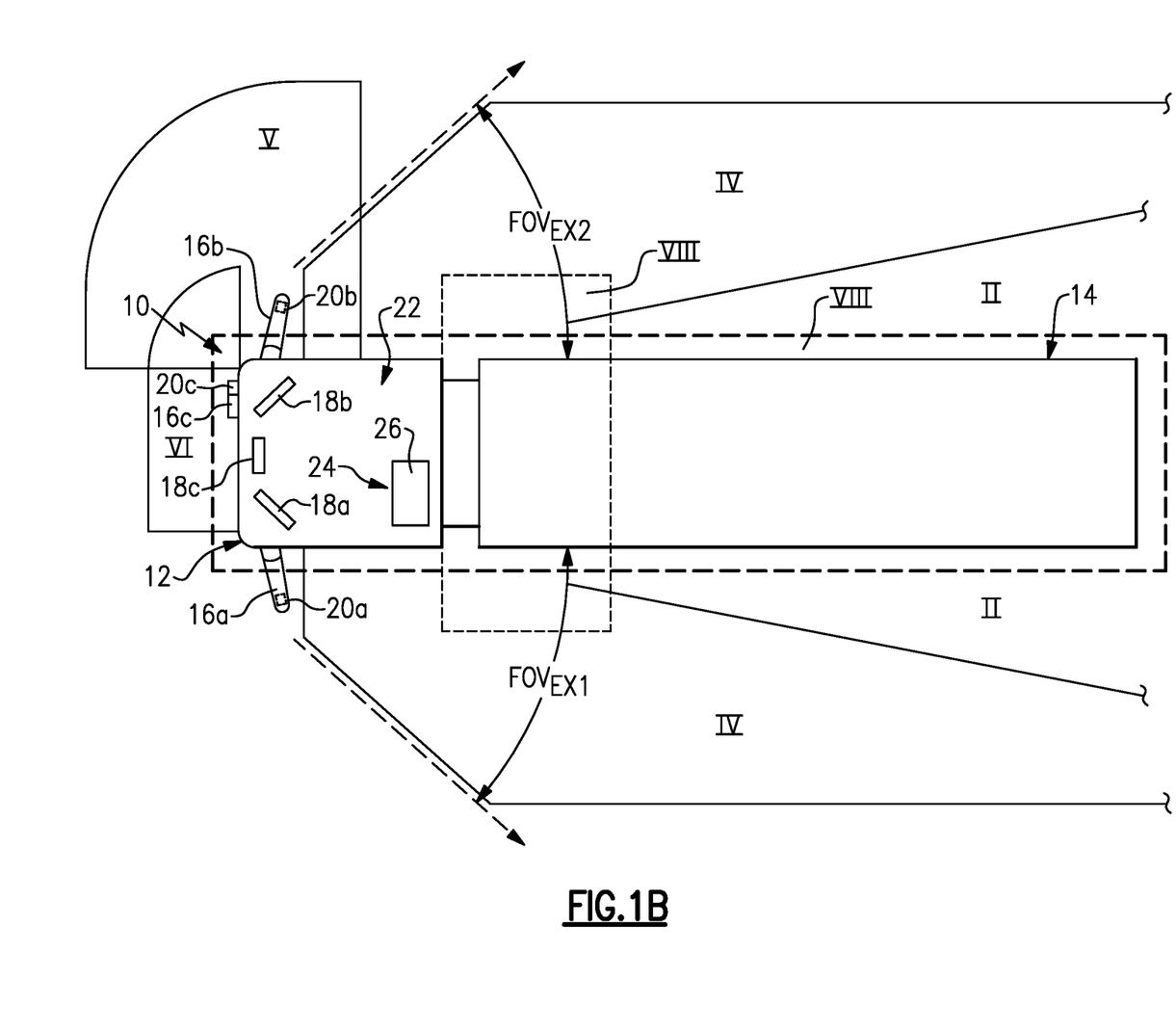
FIG. 1B is a schematic top elevational view of a commercial truck with a camera monitoring system providing Class II, Class IV, Class V and Class VI views.
Figure 2:
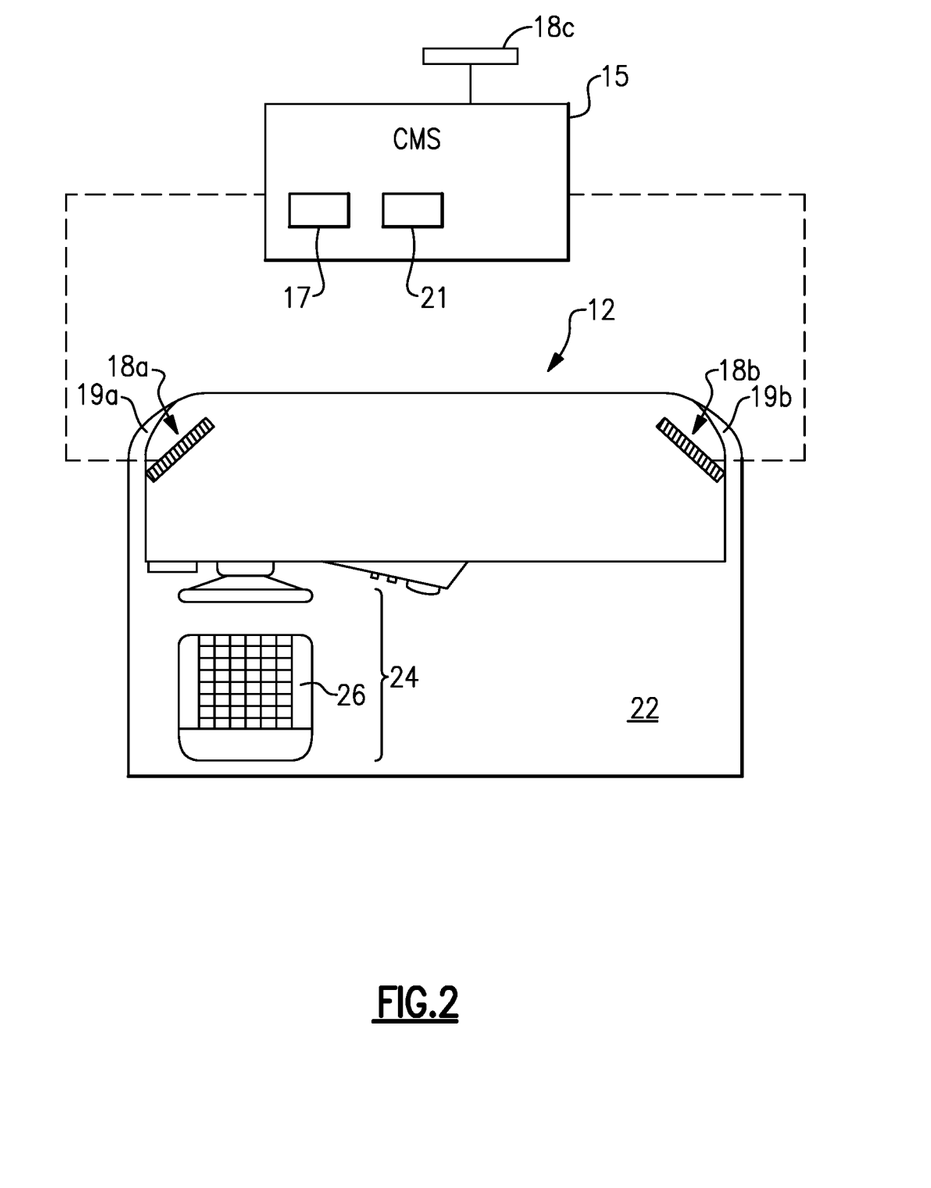
FIG. 2 is a schematic top perspective view of an vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and forward facing camera 20c may be arranged at or near the front of the vehicle 10 to provide those views (FIG. 1B). The forward facing camera 20c is configured with a field of view that includes the class V and Class VI areas and extends beyond the Class V and VI zones toward the horizon. A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, additional camera housings can be disposed at the sides and rear of the vehicle 10 to provide additional fields of view including some or all of the class VIII zones of the vehicle 10. As illustrated, the Class VIII view includes views immediately surrounding the trailer 14, and in the rear proximity of the vehicle 10 including the rear of the trailer 14. In one example, a view of the rear proximity of the vehicle 10 is generated by a rear facing camera disposed at the rear of the vehicle 10, and can include both the immediate rear proximity and a traditional rear view (e.g. a view extending rearward to the horizon, as may be generated by a rear view mirror in vehicles without a trailer 14). In such examples, the third display 18c can include one or more frames displaying the class VIII views. Alternatively, additional displays can be added near the first, second and third displays 18a, 18b, 18c or at alternate locations within the cab of the vehicle 10 and provide a display dedicated to providing a class VIII view.

Figure 3:
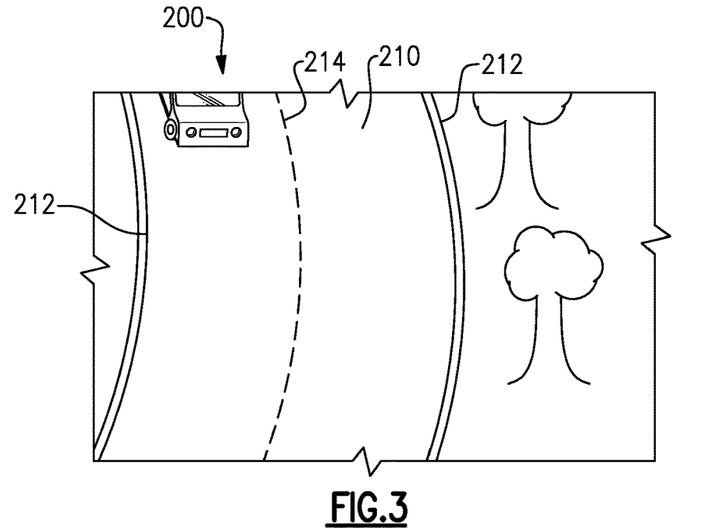
FIG. 3 schematically illustrates a view generated by a forward facing camera within the CMS of FIGS. 1A and 1B.
Figure 4:
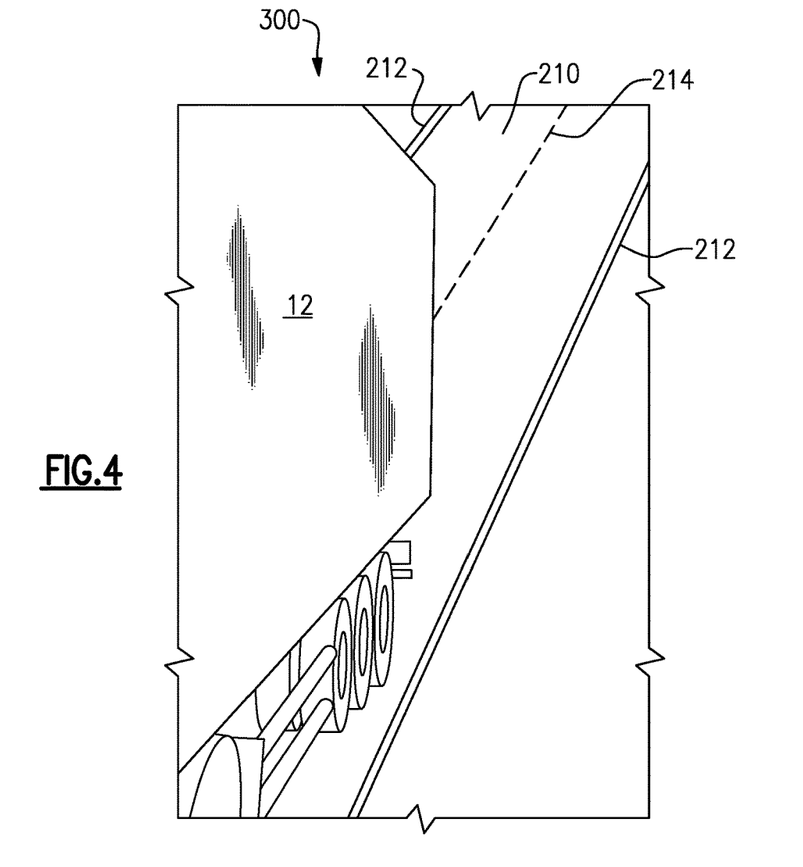
FIG. 4 schematically illustrates an example rear side view generated by the CMS of FIGS. 1A and 1B.

With continued reference to FIGS. 1A-2, FIG. 3 schematically illustrates an exemplary forward facing view 200, such as could be generated by the forward facing camera 20a, or by any similarly positioned camera. Included within the view 200 is a road 210, on which the vehicle 10 is traveling. The road 210 includes lane lines 212, 214 with outside lane lines 212 being defined by solid lines and the inside lane line 214 being defined by dashed line segments. The lanes defined by the lane lines 212, 214 are a standardized width apart, with the width being consistent along the length of the road 210. In most cases, the widths of the road 210 and the lanes on the road 210 are standardized per local regulations and will be consistent across multiple different roads within a given locality. Simultaneously with the forward facing view 200 of FIG. 3, the rear facing side cameras 20a, 20b generate rearward facing views 300, including a trailer 12 and the road 210, which is illustrated in FIG. 4, with like numerals indicating like elements. While FIG. 4 illustrates a view from the driver's side of the vehicle 10, a similar view is generated by the passenger side camera 18b.

In yet further example vehicles, additional cameras may be included within the CMS 15 and provide similar images including all or part of the road 210. The expressly shown and described views are exemplary and any combination of views including the lane lines 212, 214 can be used in the processes described herein.

With continued reference to FIGS. 1A-4, FIG. 5 schematically illustrates example operations of vehicles 10 equipped with the CMS 15 described herein. The CMS 15 includes image analysis software configured to use edge detection and similar processes to identify the positioning of the lane lines 212, 214 within the various images received from the cameras 20a, 20b, 20c and other cameras in the CMS 15. The positioning of the lane lines 212, 214, relative to the vehicle 10, can be traced over time by the CMS 15, thereby determining how centered the vehicle 10 is within the corresponding lane 210a, 210b and to identify a path (driving line 410) followed by the vehicle 10. This process is referred to as image based centering. The lane centering determines how far the center of the vehicle 10 is from each lane line 212, 214, and this distance can be used in multiple ways by the CMS 15, as well as other vehicle systems such as driver assist systems.

Figure 5:
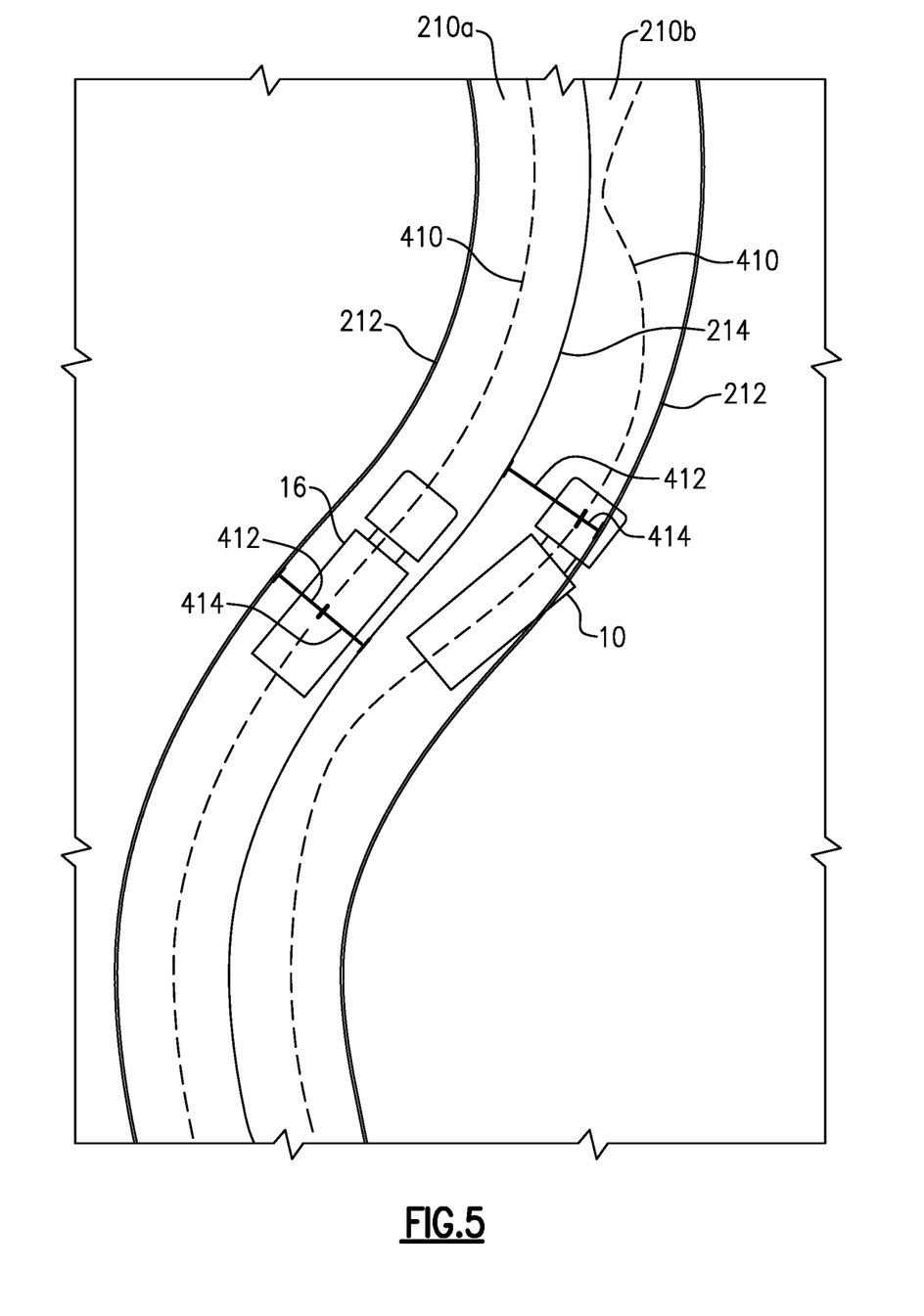
FIG. 5 schematically illustrates operation of an image based impaired driving detection module within the CMS.

The CMS 15 further includes an impaired driving detection and analysis module 17. The impaired driving detection and analysis module 17 is a software module within the controller of the CMS 15. The software module 17 is configured to analyze the vehicle path over time (driving line 410), as determined by the image based lane centering, to identify and respond to indications of impaired driving.

During general operation of the vehicle 10, the impaired driving detection and analysis module 17 uses edge detection image analysis on the images 200, 300 received from the cameras within the CMS 15 to identify the lane line edges and determine the position of the vehicle relative to each lane (centering). The detected positioning of each of the lane lines 212, 214 within the images is converted to a three dimensional position relative to the vehicle 10. The three dimensional position is then used to determine how centered (e.g. how close to equal the distances 412, 414 between the lengthwise center of the vehicle 10 and the inner edges of the lane lines 212, 214 are.)

The impaired driving detection and analytics module 17 then compares how centered the vehicle 10 is against predetermined criteria. When the centering does not meet the predetermined criteria, the module 17 detects that an impaired driving event is occurring or has occurred.

In one example the criteria can be an instantaneous centering. In this example, when the vehicle 10 is out of center by greater than a predetermined amount (e.g., the inequality between the distances 412, 414 exceeds the predetermined distance) the driver is deemed to be inattentive. By way of example, the predetermined distance in one example is two feet. In a practical example, the deviation distance is dependent of lane width and a calibration table can be employed with a look up table correlating road type to lane width such that appropriate distances can be selected. In yet a further example, this value determined by consulting the lookup table can be adjusted based on a factor related to the actual lane width as determined by the CMS 15 using image analysis.

It can be mathematically calculated when the deviation from the center overshoots beyond the edge by the predetermined distance, and the CMS mark increments a possible impaired driving counter. Once the counter reaches a certain value (e.g., after a certain number of collective events within a given time frame) a record for impaired driving is triggered. In one specific implementation the impaired driving counter is decremented over time at a predefined rate in order to compensate for accidental events that may falsely increment the possible impaired driving counter.

In one specific example, a lane width of 11-12 feet (3.35-3.66 meters) is recommended by the United States Federal Highway administration. Trailer widths are approximately 8 feet 4 inches (2.54 meters), therefore deviation greater than 2 feet 4 inches (0.71 meters) can be used as a trigger for highways in the United States. Further, the ratios between the lane width, the trailer width, and the deviation can be used as a calibration parameter for roads having a different lane width and/or trailers outside of the standard trailer width.

In an alternate example, when the vehicle centering over time (the driving line 410) does not match, or approximately match, the curvature of the lane lines 212, 214 over time the driver is determined to be inattentive. As used herein, the curvature of the lane lines refers to the path of the lane lines and can included extended straight portions where minimal, if any, geometrical curvature occurs. The curvature of the lane lines 212, 214 is, in one example, determined using the same image analysis process by which the CMS 15 identifies the vehicle 10 centering. As used herein, "approximately matching" refers to a driving line 410 have a contour that includes minimal deviations from the lane line 212, 214 as would be expected of an attentive driver. The deviation from the lane line 212, 214 can be determined using the same, or similar, predefined distance and/or adjusted predetermined distance methodology described above with regards to the instantaneous centering.

In yet another alternate example, inattentive driving is detected when either the vehicle 10 is out of center by greater than the predetermined amount or the vehicle centering over time does not approximately match the curvature of the lane lines.

In some examples, the CMS 15 further includes a GPS and/or geospatial positioning system 21 configured to identify a geospatial location of the vehicle 10. In these examples, the geospatial location of the vehicle 10 is used to identify the positioning of the vehicle 10 relative to a set of map data, and the set of map data is used to identify an expected contour of the road 210a, 210b. The expected contour of the road is then used to verify the accuracy of the image based lane line contours or as a replacement for the image based lane line contours. In this way the positioning system 21 supplements and enhances the image based analysis.

With continued reference to FIGS. 1-5, FIG. 6 illustrates a method 500 for performing the general procedure described above. The CMS 15 initially detects a vehicle centering and tracks the centering over time in a "Detect Vehicle Centering Over Time" step 510. As described above, this centering determines a driving line 410 and the driving line 410 is compared to an instantaneous centering threshold, a lane contour, or both in a "Compare Centering to Predetermined Criteria" step 520. When the predetermined criteria is met, the impaired driving detection and analysis module 17 activates one or more inattentive driver response in an "Activate Inattentive Response" step 530.

Figure 6:
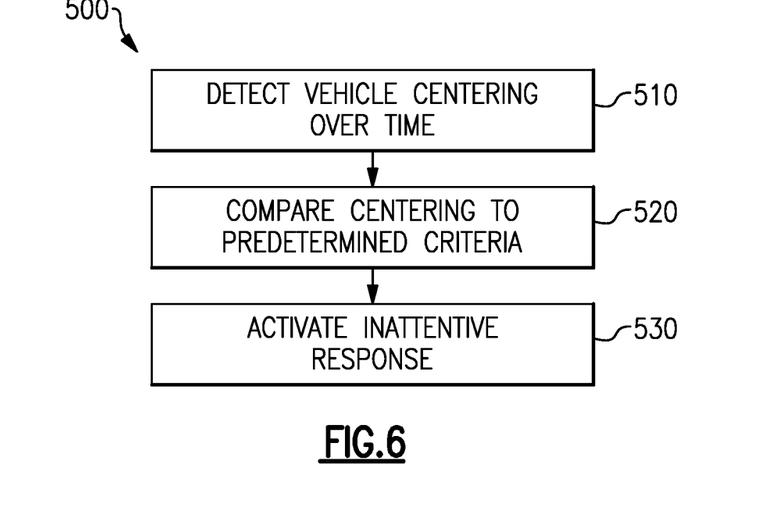
FIG. 6 illustrates a high level example process for using a CMS to identify an impaired driving event, and triggering a response.

The inattentive response is, in one example, an audible and/or visual alert to the vehicle operator. The alert cues the driver's attention in an active attempt to remedy the inattentive driving. In one example, the alert can include flashing warnings on the display screens accompanied by harsh audio outputs.

In another example, the inattentive response is an activation of a fleet monitoring system that monitors data about inattentive operations and stores the monitored data for subsequent upload to a fleet monitoring system or to any similar system or database for monitoring vehicle operations. In one variation on this example, the CMS 15 includes remote networking hardware and the monitored data is uploaded as the inattentive driving occurs as well as, or instead of, saving the data locally for a subsequent upload.

The data stored and/or uploaded includes vehicle parameters (speed, steering angle, gear, engine RPMs, geospatial positioning of the vehicle, etc.) from the general vehicle controller(s) that is obtained by the CMS through a CAN bus or similar system, image data from the cameras within the CMS 15, and any information derived from either or both of the vehicle parameters and the image data (e.g., percentage deviation from the center line, road conditions, lane width, etc.). In the case of local data storage for a later upload, the storage can only occur when the inattentive driving detection triggers or be stored periodically depending on the amount of memory on-board the vehicle.

Once uploaded, the fleet management system utilizes the inattentive driving data to continuously monitor driver statistics for a given driver, monitor driving across an entire fleet, provide data for potential incident reports, or any similar use.

With continued reference to FIGS. 1-6, FIG. 7 schematically illustrates a method 600 for responding to an inattentive driver alert. Initially when the CMS 15 indicates an inattentive driver, per the method 500 described above, the CMS 15 activates a driver monitoring subroutine in an "Active Driver Monitoring" step 610, and approximately simultaneously activates a driver alert system within the CMS 15 in an "Activate Driver Alert" step 620. As used herein, "approximately simultaneously" refers to the steps 610, 620 occurring independently of each other and at similar instances in time. It is appreciated that a single controller may not be able to achieve exact simultaneous operation in a practical embodiment.

Figure 7:
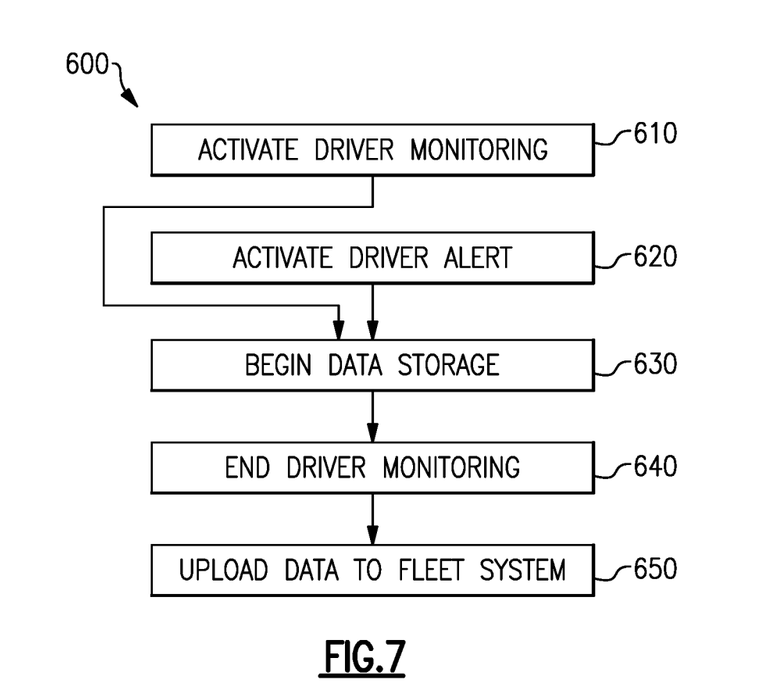
FIG. 7 illustrates a high level method for responding to an inattentive driving event detected using the method of FIG. 5.

Once activated, the driver monitoring step 610 determines data incoming to the CMS 15 that is relevant to the inattentive driving (e.g., speed, steering angle, gear, engine RPMs, geospatial positioning of the vehicle), image data used to make the initial detection, continuing image data received from the cameras (e.g., Class IV images on both sides), vehicle operation data at the time of the inattentive operation from general vehicle controllers, and the like is collected by the CMS 15 and stored in a non-transitory memory of the CMS 15 in a "Begin Data Storage" step 630.

The data storage continues until the latter of a predetermined time period (e.g., 5 minutes) after the vehicle operation resume attentive operations or after a minimum time period. After which, the CMS 15 ends the driver monitoring process in a "End Driver Monitoring" step 640. Subsequent to ending data collection the stored data is uploaded to a fleet monitoring system in an "Upload Data to Fleet System" step 650.

In some examples, where the vehicle 10 has a wireless data connection capable of connecting with a central data repository, the data can be uploaded simultaneously with collection and storage until the cessation of the inattentive driving event.

By implementing the above described CMS features, vehicle operations can be monitored, and inattentive operations can be flagged and tracked, for fleet owners, insurance purposes and/or driver feedback. Further, in some examples, use of the monitoring system described herein allows the monitoring to be achieved without direct monitoring (e.g. video recording) of the vehicle operator.

Although an example embodiment has been disclosed, a worker of ordinary skill in this art would recognize that certain modifications would come within the scope of the claims. For that reason, the following claims should be studied to determine their true scope and content.

What is claimed is:

1. A method for detecting inattentive vehicle operation comprising:

using a camera monitor system (CMS) controller to identify a vehicle centering of a vehicle containing the CMS controller by analyzing at least one image generated by the CMS, the vehicle centering corresponding to how centered the vehicle is within first lane line and a second lane line; and incrementing an impaired driving counter in response to the vehicle centering deviating from a lane center according to a predefined characteristic;

decrementing the impaired driving counter over time predefined rate to compensate for accidental events; and based on the impaired driving counter reaching a certain value within a given time period, activating an inattentive driving response.

2. The method of claim 1, wherein the predefined characteristic includes at least one of an instantaneous value of the vehicle centering and the vehicle centering over time.

3. The method of claim 2, wherein the predefined characteristic is the vehicle centering over time, and wherein the deviation is a difference between a curvature of a line defined by the vehicle centering over time and a curvature of a lane defined by the first lane line and the second lane line.

4. The method of claim 3, wherein the curvature of the lane is determined at least in part by determining a geospatial positioning of the vehicle determined by the CMS controller and comparing the geospatial positioning to map data.

5. The method of claim 3, wherein the curvature of the lane is determined at least in part using image analysis of the at least one image generated by the CMS.

6. The method of claim 5, wherein the curvature of the lane is determined exclusively using image analysis of the at least one image generated by the CMS.

7. The method of claim 1, wherein the inattentive driving response includes any combination of one or more of storing driving parameters for subsequent upload to a remote fleet monitoring system, uploading driving parameters to the remote fleet monitoring system, activating an audio alert to a vehicle operator, and activating a visual alert to the vehicle operator.

8. The method of claim 7, wherein the driving parameters include at least two of speed, steering angle, gear, and engine RPMs and the at least one image generated by the CMS.

9. The method of claim 1, wherein the at least one image generated by the CMS includes at least one of a rear facing image generated by a trailer mounted rear facing camera and an image generated by a Class II/IV mirror.

10. A Camera Monitoring System (CMS) for a vehicle comprising:

a plurality of exterior facing cameras disposed about the vehicle, each camera defining a field of view configured to include at least one lane line defining a lane in which the vehicle is operating while the vehicle is moving; and a CMS controller configured to receive images from each of the cameras of in the plurality of exterior facing cameras and including a non-transitory memory and a processor, the non-transitory memory being configured to cause the controller to:

identify a vehicle centering of a vehicle containing the CMS controller by analysis of at least one image generated by the CMS, the vehicle centering corresponding to how centered the vehicle is within a first lane line and a second lane line, and increment an impaired driving counter response to the vehicle centering deviating from a lane center according to a predefined characteristic;

decrement the impaired driving counter over time at a predefined rate to compensate for accidental events; and based on the impaired driving counter reaching a certain value within a given time period, activate an inattentive driving response.

11. The CMS of claim 10, wherein the predefined characteristic includes at least one of an instantaneous value of the vehicle centering and the vehicle centering over time.

12. The CMS of claim 10, wherein the predefined characteristic is the vehicle centering over time, and wherein the deviation is a difference between a curvature of a line defined by the vehicle centering over time and a curvature of a lane defined by the first lane line and the second lane line.

13. The CMS of claim 10, wherein the inattentive driving response includes any combination of one or more of storing driving parameters for subsequent upload to a remote fleet monitoring system, uploading driving parameters to the remote fleet monitoring system, activating an audio alert to a vehicle operator, and activating a visual alert to the vehicle operator.

* * * * *